(No Model.) 2 Sheets—Sheet 2.
H. SCHULZE-BERGE.
GEAR CUTTER.
No. 320,179. Patented June 16, 1885.
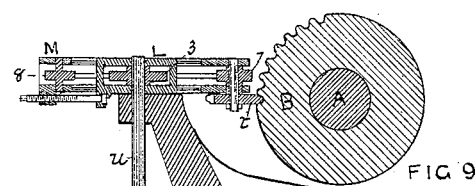
FIG. 9
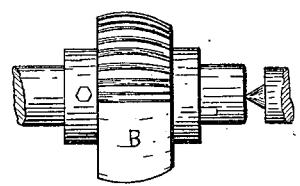
FIG. 12
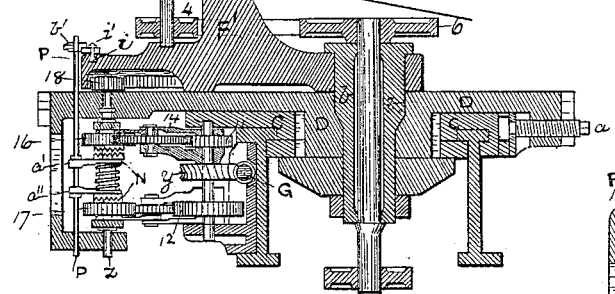
FIG. 11.
FIG. 10.
WITNESSES:
INVENTOR
Hermann Schulze-Berg.
by his attys
Bakewell & Kerr

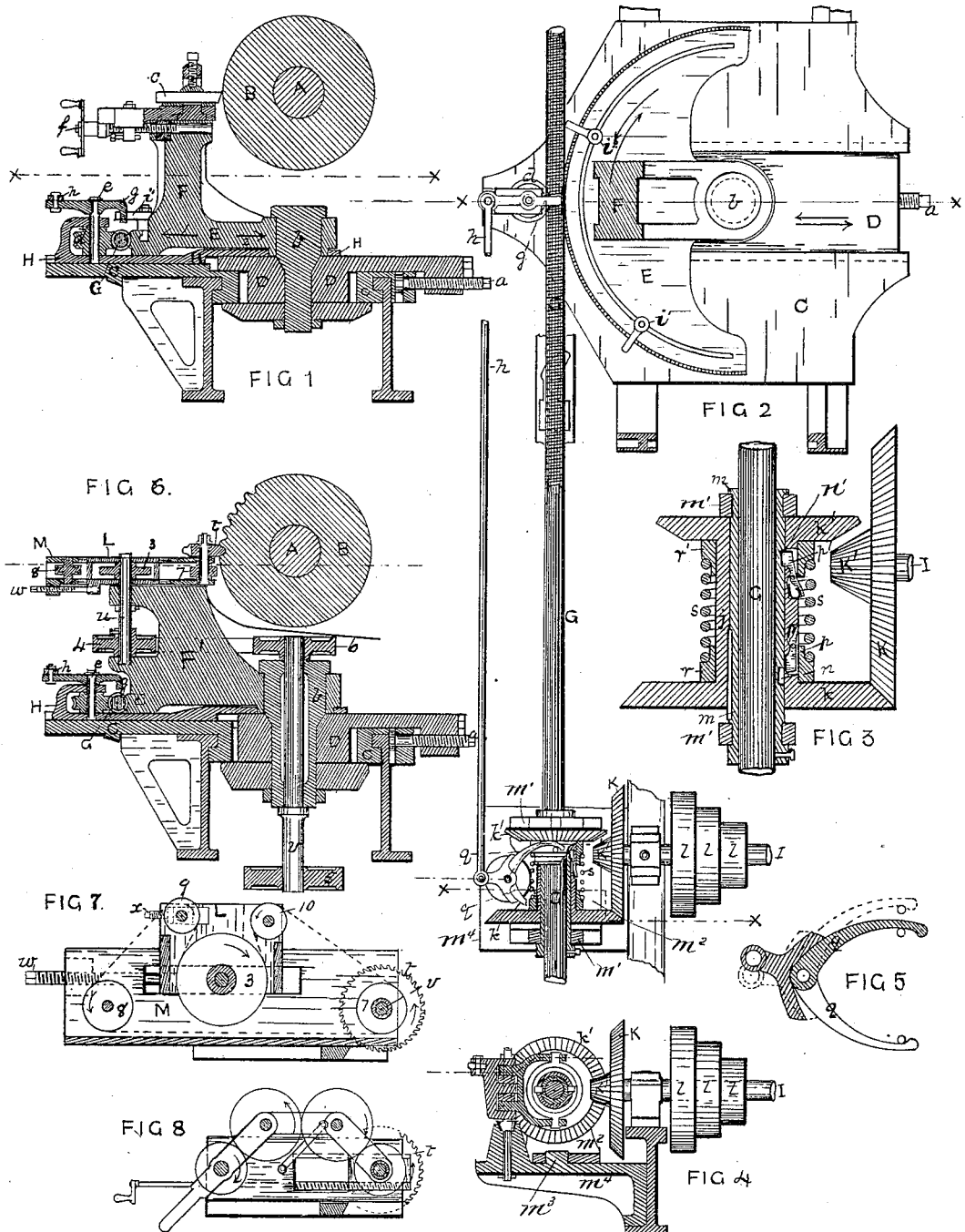

UNITED STATES PATENT OFFICE.

HERMANN SCHULZE-BERGE, OF ROCHESTER, PENNSYLVANIA.

GEAR-CUTTER.

SPECIFICATION forming part of Letters Patent No. 320,179, dated June 16, 1885.

Application filed July 14, 1884. (No model.)

*To all whom it may concern:*

Be it known that I, HERMANN SCHULZE-BERGE, of Rochester, in the county of Beaver and State of Pennsylvania, have invented a new and useful Improvement in Gear-Cutting Machinery; and I do hereby declare the following to be a full, clear, and exact description thereof.

In my pending application for Letters Patent for improvement in gear-wheels, Serial No. 117,135, filed January 11, 1884, I have described an improvement in gear-wheels in which the wheels are either a spheroid or hemispheroid, or a section of a spheroid, in which the shaft of the wheel is in the line of the polar axis of the spheroid, the chief utility of which is that the axes of two or more such gear-wheels when geared together may be placed parallel or at any desired angle to each other, the angle of inclination of the axes of the wheels being changeable without throwing the wheels out of gear. To accomplish this result, the pitch-line of the spheroidal gear-wheels must be concentric with the polar axis of the wheel on a plane at right angles thereto; or, in other words, the pitch-line must coincide with the surface of an imaginary sphere, while the surface of the wheel at the outer edge of the teeth will be an oblate spheroid, while the surface at the base of the teeth will be a prolate spheroid. It is very difficult to construct such gear-wheels by means of any gear-cutting machinery heretofore constructed and used, and almost impossible to do so with anything like exactness.

The object of my invention is the construction of a machine with which spheroidal gear-wheels can be constructed with rapidity and accuracy. In order to accomplish this, my improved machine first gives the exact requisite oblate spheroidal shape to the piece of metal to be formed into a gear-wheel, and then cuts the teeth from pole to pole of the spheroid of varying depth, so that the surface of the wheel at the base of the teeth may be prolate to the same degree as its surface at the outer edge of the teeth is oblate, while the pitch-line of the teeth lies in the surface of an imaginary sphere. My improved machine is equally adapted to the shaping and gear-cutting of spheroidic gear-wheels, such as described in another application, Serial No. 127,448, filed by me on April 11, 1884, in which the shape of the gear-wheels is spheroidic, but is only a section of a spheroid, a portion of the spheroid being removed at each pole, leaving only an equatorial section of any desired width or thickness. In this case the tool-carrier will traverse a smaller arc of a circle in its motion around the block to be shaped or cut.

In Sheet 1 of the accompanying drawings, the several figures represent my improved machine, while in Sheet 2 is represented a modification on the construction.

Figure 1 is a vertical section on the line $x$ $x$ of Fig. 2. Fig. 2 is a plan view of the machine below the line $x$ $x$, Fig. 1. Figs. 3, 4, and 5 are views of the power connections and reversing devices. Fig. 6 is a vertical section of the machine when adapted to operate with a milling-tool instead of a chisel. Figs. 7 and 8 illustrate the construction of power-connections for driving the milling-tool. Fig. 9 is a vertical section of a modification of the machine. Fig. 10 is a horizontal section on the line $y$ $y$ of Fig. 9. Fig. 11 is an enlarged sectional view of the reversing mechanism shown in Fig. 9. Fig. 12 is a view of a wheel which is a section of a sphere upon which a portion of the teeth have been cut.

In Figure 1 A is a spindle of a turning-lathe, on which is centered the metallic block B, which is to be shaped into a gear-wheel, which is cast or otherwise made of iron, brass, or other metal of the approximate shape of the gear-wheel. If the gear-wheel is to be placed when in use on an axle, the block B may be bored in the line of the polar axis of the gear-wheel before being placed in the lathe and the spindle of the lathe inserted through the bored hole and the block securely fastened thereto.

C is the bed-plate of the lathe, which is stationary.

In a groove in the bed-plate C, at right angles to the spindle of the lathe, is a sliding carriage, D, which is capable of a motion of adjustment toward or from the lathe-spindle, which motion is effected by means of a screw, $a$, swiveled at its inner end to the bed-plate C, and working in a female screw in a flange at the outer edge of the sliding carriage.

E is the tool-carrier which holds the chisel or other tool by which the surface of the block B is planed and the gear-teeth are cut. This tool-carrier E has a semicircular base, as shown in Fig. 2, the outer edge or circumference of which extends onto the bed-plate C, while at the center of its base it rests upon and is carried by the sliding carriage D, to which it is pivoted at its center by the bolt $b$.

The tool-carrier E has an upright standard, F, constructed similarly to the slide-rest of a lathe, in which the chisel or planer $c$ is secured, which, by means of a feed-screw, $f$, can be moved to or from the object to be planed. The screw $f$ works in a nut, $f'$, and moves the slide $f^2$, which is placed in suitable ways in the carrier E and holds the tool $c$ toward or away from the block B. This construction is similar to that used in ordinary lathes for planing metals, and need not be more particularly described. The center of motion of the tool-carrier E around the bolt $b$ is placed in a vertical plane passing through the axis of the lathe-spindle A, and the center of the spherical block B to be planed is placed in a vertical line passing through the axis of the bolt $b$. From this construction it will be evident that if the lathe-spindle A, carrying the block B, is revolved on its axis and the tool-carrier is slowly turned on its pivot, (the bolt $b$,) with the planing-tool $c$ pressed against the surface of the block B, the block will be planed to a true spherical shape. If, however, the sliding carriage D is adjusted by the screw $a$, so as to bring the axial line of the bolt $b$ slightly beyond the vertical plane passing through the axis of the lathe-spindle A, (in the direction of the arrow in Fig. 1,) the block B will be planed to the shape of an oblate spheroid, corresponding to the required exterior surface of the spheroidal gear-wheel.

The requisite movement of the tool-carrier about its center of motion at $b$ is effected by means of a screw-shaft, G, placed horizontally at right angles to the sliding carriage D, the screw-shaft G touching tangentially the semicircular edge of the base-plate E of the tool-carrier, in which are cog-teeth which gear into the threads of the screw-shaft.

As the base-plate E of the tool-carrier is only semicircular, as in the drawings, it cannot have a continuous rotary motion, and it is therefore necessary to give it an intermittent motion of a half-revolution or less in one direction, and then a half-revolution or less in the opposite direction, as indicated by arrows in Fig. 2. The reversal of the motion of the tool-carrier may be effected by any suitable device for that purpose. That which I employ is shown in Figs. 2, 3, 4, and 5, which I will proceed to describe.

On the bed-plate C of the lathe, on the opposite side of the screw-shaft G from the curved base-plate E of the tool-carrier, and immediately opposite to the point where the screw-shaft G gears into the cog-teeth on the periphery of the base-plate, is a small friction-roller with curved groove, which serves to keep the screw-shaft G in gear with the teeth on the edge of the base-plate. This pinion $d$ is mounted on a short shaft, $e$, which has its bearing in a sliding-plate, H, which is connected with the sliding carriage D by the bolt $b$ so as to move back and forth with it. On the upper end of the shaft $e$ is pivoted a short lever, $g$, having two arms, the shorter one extending over the screw-shaft G, and the longer arm extending in the opposite direction. To the extremity of the longer arm of the lever $g$ is pivoted one extremity of a shifting-rod, the other end of which operates the reversing apparatus. In a groove, $i$, near the edge of the base-plate E of the tool-carrier, are fixed two stops, $i'$ $i^2$, which may be placed at any desired point on the base-plate E, so as to reverse the motion of the tool-carrier at any desired point. By reference to Fig. 2 it will be seen that as the tool-carrier revolves in either direction one of the stops $i'$ or $i^2$ will come in contact with the short arm of the lever $g$, and will cause it to turn, thus moving the shifting-rod $h$, which immediately reverses the motion of the screw-shaft G, thus causing the tool-carrier to move in the opposite direction on its center at $b$.

On the other end of the screw-shaft G is secured by means of a spline or feather a cylindrical sleeve, $j$, at each end of which is a beveled cog-wheel $k$ and $k'$. (Shown enlarged in Fig. 3.) At right angles to the screw-shaft G is the main driving-shaft I, with pulley-wheels 1 1 1, and beveled cog-wheel K. This cog-wheel has also a small beveled cog-wheel, K', turning with it and mounted on the same shaft I. When the sleeve $j$ is shifted on the screw-shaft G, one or either of the beveled wheels $k$ or $k'$ is thrown into gear, the wheel $k'$ with the wheel K', or the wheel $k$ with the wheel K, and accordingly as it is geared with one or other, the screw-shaft G rotates in one direction or the other.

The sleeve-shaft $j$ is not mounted directly on the screw-shaft G, but on an inner cylinder or sleeve, $m$, which is keyed to the shaft G. This inner sleeve has two notches, $n\,n'$, (shown in Fig. 3,) which receive the head of a spring-pawl, $p$ or $p'$, pivoted to the outer sleeve, $j$. When the bevel-wheel $k$ is in gear with the bevel-wheel K, (as in Fig. 3,) the spring-pawl $p'$ is in its notch $n'$, which prevents the sleeve from sliding and throwing the wheels out of gear. Two rings, $r\,r'$, are placed on the outer sleeve, $j$, which rings are kept apart and pressed against the bevel-wheels $k$ and $k'$, respectively, by a spiral spring, $s$, which surrounds the sleeve $j$, and bears against both of the rings $r\,r'$. If the sleeve $j$ were slid on the shaft G so as to bring the bevel-wheel $k'$ into gear with the wheel K', the ring $r'$ would depress the free end of the pawl $p'$ and release it from its notch at the same time the bevel-wheel $k$ is thrown out of gear with the wheel K, and the pawl $p$, being released by the ring $r$, enters the notch $n$ as soon as the sleeve $j$ is slid far enough. (See Fig. 3.) The sleeve *j* is moved by means of the rod *h*, operated as before described. The rod *h* is attached to a pair of pivoted arms, *q q*, (shown enlarged in Fig. 5,) which span the distance between the rings *r r'*, and engage a pin projecting from each sleeve. Fig. 4 shows a cross-section of this reversing device on the line *x x* in Fig. 2.

When the size of the block B is such as to require adjustment, it can be done by adjusting the tools *c* or *t* upon the tool-carrier F by means of screws *f* or *w*, enabling gear-wheels to be cut varying in radius all the way from the axial line of the lathe up to the inner front of the tool-carrier F. When the shape or size of the block B is such as to require the adjustment of the plate D by means of the adjusting screw *a*, in order to bring the tool *c* or *t* into proper position to perform its required work upon the block B, there will be a slight radial movement of the the screw-shaft G. This is effected by means of the following construction: As shown in Fig. 3, the screw-shaft G is surrounded by a sleeve, *m*, which sleeve is journaled in bearings *m'*. These bearings *m'* are secured to the base-plate *m²*. (Shown in Figs. 2 and 4.) This base-plate rests upon a bed, *m⁴*, which is radially attached to the frame of the machine, as shown in Fig. 4. The bed *m⁴* is provided with a pivoted pin, *m³*, arranged about midway between the two beveled gear-wheels *k k'*, and the base-plate *m²*, which carries the bearings *m'*, is placed on the said pivot so as to turn around the same and permit the necessary movement of the screw-shaft G, together with the gear-wheels *k k'*. The oscillating movement of the screw-shaft G is necessarily very slight, particularly at its pivotal point, so that it makes no practical difference in the ability to throw the gear-wheels *k k'* into and out of connection with the gear-wheels K K'. In cutting gear-teeth of the usual height with a screw-shaft proportionately as long as the shaft G in Fig. 2, the oscillation of said shaft G around the pivot *m³* to effect the necessary adjustment is almost imperceptible, and the construction shown permits of quite a sufficient adjustment of the screw-shaft without interfering with the operation of the machine for all usual purposes. In the construction shown in Figs. 9 and 10 the screw shaft G does not oscillate or change its axial position, as will be fully understood, which is also the case in many other known constructions which may be used in the place of the one shown in Fig. 2. The construction shown in Figs. 9 and 10 is an improved device for the purpose of communicating rotary motion to the tool-carrier F, which is variable with relation to its position relatively to the axial line of the lathe from the screw-shaft G, which revolves in bearings radially attached to the lathe. This rigid attachment of the bearings of the screw-shaft G to the lathe necessitates a self-adjusting revoluble connection between the tool-carrier F and the screw-shaft G.

The metal block B to be formed into a spheroidal gear-wheel may thus be planed to the shape of a true sphere or of a prolate or oblate spheroid, as may be desired. When this is effected the next thing is to cut the gear-teeth. In order to effect this by the devices hereinbefore described, the revolution of the spindle A is stopped, and the cutter *c* is turned one-quarter round, so that its cutting-edge, which, when the apparatus is used to plane the surface of the block into the shape of a spheroid, is adjusted so as to be parallel to the axis of the lathe-spindle, shall now be at right angles to the axis of the lathe-spindle A. The tool-carrier is then caused to turn on its axis *b* and the chisel is pressed against the surface of the block B by means of the feed-screw *f*. The motion of the tool-carrier is effected, as before described, by the screw-shaft G, which, after moving the requisite distance to cut out the spaces between the cog-teeth, is brought back to its starting-point by the reversal of the motion, and the operation is repeated until the requisite depth of teeth is attained. The reverse motion is effected with much greater rapidity than the direct motion, owing to the fact that the gear-wheel K' is of much smaller diameter than the gear-wheel *k'*, while the gear-wheels K and *k* (which produce the reverse motion) are of the same diameter.

When one groove has been cut in the surface of the block B parallel to its polar axis, and as near to each pole as may be desired, the lathe-spindle A is turned a distance equal to the width of one tooth, and it is then again fixed so as to be incapable of rotation on its axis, and the operation is repeated until all the teeth are cut to the required depth.

In case the pitch-line of the teeth is in the surface of a true sphere, the surface of the block B at the base of the teeth will be a prolate spheroid, as before stated, and in order that this may be the case in the finished wheel the center of motion *b* of the tool-carrier is moved in the direction of the arrow 2, Fig. 1, until the axial line of the bolt *b* is set as far beyond the vertical plane of the axis of the spindle A of the lathe in that direction as it was set in the direction of the arrow 1 when the surface of the block B was being planed. The result then will be that the surface of the gear-wheel at the face of the teeth will be an oblate spheroid, the surface at the base of the teeth a prolate spheroid, and the imaginary surface at the pitch-line a sphere.

If it is desired to cut the teeth of the gear-wheels with a milling-tool instead of a chisel, a slight modification of the machine used for cutting the teeth will be necessary, which I will now proceed to describe.

Fig. 6 represents a sectional elevation of this modification of the machine. The spindle A, bed-plate C, and sliding carriage D may be constructed, as before described, in reference to Fig. 1. The screw-shaft G and reversing devices may also be similarly constructed and arranged. The standard F'' of the tool-carrier, instead of being furnished with a slide-rest, as in Fig. 1, has at its upper end a horizontal frame, L, attached to it, within which revolves the pulley 3, attached to the upper end of the short vertical shaft $u$, which has its bearings in the standard F' of the tool-carrier. The shaft $u$ has a larger pulley, 4, attached to it near its lower end. The bolt $b$, which, as in Fig. 1, serves as the center of motion of the tool-carrier, is in the machine shown in Fig. 6 made hollow, so as to form a bearing for the vertical shaft $v$. This vertical shaft $v$ has a driving-pulley, 5, at its lower end, and another pulley, 6, at its upper end, and a driving-belt, connecting pulleys 6 and 4, communicates a revolving motion to the shaft $u$.

A sliding frame, M, is connected with the frame L at the upper end of the standard F' of the sliding carriage, as shown in Fig. 7, by means of a slot in the frame M, which slot surrounds the stationary frame L, so that by means of the feed-screw $w$ the sliding frame, which carries the milling-tool $t$, may be moved toward or from the spheroidal gear-wheel B in which the teeth are to be cut. The vertical shaft of the milling-tool $t$ has its bearing in the end of the sliding frame M nearest to the spindle A of the lathe, and has near its lower end a small pulley, 7. A similar pulley, 8, has its bearing at the other end of the sliding frame M, and two other small pulleys, 9 and 10, have their bearings in the stationary frame L attached to the standard F. A belt passing around the pulleys 7, 8, 9, 10, and 3, as shown by dotted lines in Fig. 7, communicates the rotary motion of the driving-pulley 5 to the milling-tool $t$, which, by the arrangement described, is not interfered with by the feed-motion of the sliding frame M. One of the pulleys, 9 or 10, may have its bearing in a sliding block inserted in a slot in the stationary frame L, so that by means of a screw, $x$, the tension of the belt may be regulated as desired.

Fig. 8 shows an arrangement by which gear-wheels may be employed, instead of a belt and pulleys, to drive the milling-tool $t$, by which the motion of the milling-tool may be arrested at any time without stopping the driving-shaft.

Instead of the reversing devices shown in Fig. 6, which are the same as those described in reference to Figs. 2 and 3, an arrangement may be used—such as shown in Figs. 9, 10, and 11—which places the reversing devices immediately beneath the standard of the tool-carrier, and thus makes the machine more compact.

As shown in Fig. 9, the screw-shaft G, by which the tool-carrier is caused to turn on its axis, is placed beneath the bed-plate C of the lathe, and gears into a worm gear-wheel, $y$, on a vertical shaft, which carries two cog-wheels, 11 and 12, one above and the other below the worm-wheel $y$, the lower one being the larger of the two. The lower gear-wheel, 12, gears into a cog-wheel, 13, (see Fig. 10,) hidden from view in Fig. 9, which is of the same diameter as the cog-wheel 11. Cog-wheel 11 (at the upper end of its shaft) gears into an idler cog-wheel, 14, and cog-wheel 13 gears into an idler cog-wheel, 15.

On an upright shaft, Z, which has its bearings in the front part of sliding carriage D, are the cog-wheels 16 and 17, into which the idler-wheels 14 and 15 gear, respectively. The idler cog-wheels 14 and 15 are revoluble in bearings swinging around the axle Z, and also in bearings swinging around the axles of gear-wheels 11 and 13, respectively, as shown in Fig. 10, so that when by means of screw $a$ the position of the sliding carriage D, and consequently the position of axle Z is changed with regard to the distance from the axial line of the lathe, the idler cog-wheels 14 and 15, being self adjusting, swing around the movable axle Z and around the stationary axles of gear-wheels 11 and 13, respectively, thus preserving the gearing-connection between the screw-shaft G and the foot of tool-carrier F, whatever the relative distance between screw-shaft G and axle Z may be. The cog-wheels 16 and 17 are loose on their shaft, and a sliding clutch device, N, connected with the shaft Z by a spline, operates between the cog-wheels 16 and 17, so as to throw either of them into connection with the shaft Z, while the other remains loose.

On the upper end of the shaft Z is a small cog-wheel, 18, which turns with the shaft Z and gears into cog-teeth on the arc formed by the base of the standard F' of the tool-carrier, so that as the shaft Z is caused to revolve in either direction it gives a corresponding motion of partial rotation on its axis to the tool-carrier.

The gearing before described is of such relative diameter that the gear-wheels 16 and 17 turn in opposite directions, and that the motion of wheel 16 is much more rapid than that of wheel 17, so that if the clutch device N is depressed, so as to connect the lower cog-wheel, 17, with the shaft Z the tool-carrier receives a slow motion on its axis, but when the clutch N is raised, so as to connect the upper cog-wheel, 16, with the shaft Z, a rapid motion is given to the tool-carrier in the reverse direction. This reversing of the motion of the tool-carrier is effected by a perpendicular rod, P, which has two arms, $a'$ $a^2$, connected with the clutch device N, so that when the rod P is raised it closes the upper clutch and opens the lower one, connecting the upper cog-wheel, 16, with the shaft Z and leaving the lower cog-wheel, 17, loose on its shaft.

At the edge of the base of the tool-carrier F' are two adjustable stops, $i'$ $i^2$, which can be moved to any desired position, so as to reverse the motion of the tool-carrier at any required point.

At the upper extremity of the rod P is a beveled finger, $b'$, which extends over the path of the stops $i'$ $i^2$, so that when one of the stops, $i'$, reaches the rod P it passes over the beveled finger $b'$ and depresses the rod P, and when on the reverse motion the other stop, $i^2$, reaches the rod P, it passes under the beveled finger $b'$, and thus raises the rod P, thus reversing the motion automatically. The reversing device shown in Fig. 9 is shown in section, on a larger scale, in Fig. 11.

I have described the tool-holder of my machine as having its center of rotation below the spindle of the lathe which holds the block while being planed into spheroidal shape or while having the cog-teeth cut into it in longitudinal lines from pole to pole; but this is not a necessary construction, inasmuch as the position of such center of motion may be located at any other point in the plane of the equatorial axis of the spheroid. It is, however, absolutely necessary, and is a distinguishing characteristic of my machine, that the cutting-tool while cutting or milling the space between two cogs from pole of the spheroid to the other shall move in the plane of the polar axis of the gear-wheel, and that it shall revolve intermittently between the poles in that plane, while the spheroid itself does not rotate on its axis but remains fixed until it is desired to shift it on its axis sufficiently to cut another groove between two gear-teeth. It is also necessary, as before stated, to shift the position of the cutter or milling-tool from that which is occupied when planing the surface of the block by turning it one-fourth round on its own axis, so as to present the cutting-edge properly to the surface to be cut.

I may also state that in place of giving to the tool-holder its motion partially around the spheroidal block by means of a screw and worm, as described, the same intermittent motion around a fixed center may be communicated to the tool-holder by other mechanical means—as, for example, the tool-holder may be located upon a crank revolving intermittently around the center of motion and operated by a pitman or otherwise.

It is obvious that if the block of metal B in which the gear-teeth are to be cut is cast or otherwise shaped so as not to need being planed into shape before the teeth are cut the operation of planing may be dispensed with. It is also manifest that my machine may be used with equal advantage to cut the gear-teeth on a wheel which is only a section of a sphere, such, for example, as is shown in Fig. 12.

What I claim as my invention, and desire to secure by Letters Patent, is—

1. In gear-cutting machinery, the combination of a revoluble lathe-spindle for holding and revolving the block or piece of metal to be formed into a gear-wheel, a tool-holder capable of revolving partially around the piece of metal on a center located in the plane of the equatorial axis of the intended spheroid and capable of adjustment in the said plane, and devices for communicating an intermittent partial revolution of the tool-holder, substantially as described, for the purpose of communicating a spheroidal shape to the block preparatory to cutting the gear-teeth thereon.

2. As a device for cutting gear-teeth on spherical or spheroidal gear-wheels, the combination of a lathe for holding the spherical or spheroidal piece of metal with a tool-holder capable of revolution on a center located in the plane of the equatorial axis of the spheroid, such center of motion being adjustable at right angles to the plane of the polar diameter of the gear-wheel, and devices for communicating an intermittent rotary motion to the tool-holder around said adjustable center and an independent rotary motion to the gear-cutting tool or planer, substantially as described.

3. In gear-cutting machinery, a tool-holder capable of revolving partially or intermittently around a spheroidal piece of metal in the plane of the polar axis of the spheroid, while the spheroid itself is immovably fixed, such tool-holder being furnished with a tool or planer having its cutting-edge substantially parallel to the plane of the equatorial axis of the spheroid.

4. The combination of the screw-shaft G, mounted in bearings attached radially to the lathe, with a worm-gear, $y$, gear-wheel 11, swinging idler 14, journaled in swinging bearings radiating from the axle of the gear-wheel 11, and also radiating from axle of gear-wheel 16, gear-wheel 16, axle $z$, gear-wheel 18, and oscillating tool-carrier F, provided with a segmental gear in which said gear-wheel 18 meshes, substantially as and for the purposes described.

In testimony whereof I have hereunto set my hand this 2d day of June, A. D. 1884.

HERMANN SCHULZE-BERGE.

Witnesses:
W. B. CORWIN,
THOMAS B. KERR.